United States Patent
Bonnet et al.

(10) Patent No.: US 10,400,097 B2
(45) Date of Patent: Sep. 3, 2019

(54) FLUORINATED POLYMER COMPOSITION

(71) Applicant: Arkema France, Colombes (FR)

(72) Inventors: Anthony Bonnet, Saint Laurent de Mure (FR); Cyrille Mathieu, Lyons (FR); Alejandra Reyna-Valencia, Evreux (FR); Barbara Ramfel (Epouse Wiegert), Marest sur Matz (FR); Christophe Degoulet, Villettes (FR)

(73) Assignee: ARKEMA FRANCE, Colombes (FR)

( * ) Notice: Subject to any disclaimer, the term of this patent is extended or adjusted under 35 U.S.C. 154(b) by 44 days.

(21) Appl. No.: 15/574,324

(22) PCT Filed: Jul. 27, 2016

(86) PCT No.: PCT/FR2016/051943
§ 371 (c)(1),
(2) Date: Nov. 15, 2017

(87) PCT Pub. No.: WO2017/017373
PCT Pub. Date: Feb. 2, 2017

(65) Prior Publication Data
US 2018/0134886 A1 May 17, 2018

(30) Foreign Application Priority Data
Jul. 27, 2015 (FR) ...................... 15 57155

(51) Int. Cl.
*C08L 27/16* (2006.01)
*F16L 11/04* (2006.01)
*C08J 3/00* (2006.01)
*C08L 27/20* (2006.01)

(52) U.S. Cl.
CPC ............... *C08L 27/16* (2013.01); *C08J 3/005* (2013.01); *C08L 27/20* (2013.01); *F16L 11/04* (2013.01); *C08L 2203/18* (2013.01); *C08L 2205/025* (2013.01); *C08L 2205/035* (2013.01); *C08L 2207/04* (2013.01)

(58) Field of Classification Search
CPC .... C08L 27/16; C08L 27/20; C08L 2205/025; C08L 2205/035; C08L 2203/18; C08L 2207/04; C08L 2205/03; F16L 11/04; F16L 58/10; C08J 3/005; B32B 1/08; H01B 3/445
See application file for complete search history.

(56) References Cited

U.S. PATENT DOCUMENTS

| | | | |
|---|---|---|---|
| 4,200,568 A | 4/1980 | Trautvetter et al. | |
| 8,609,756 B2 | 12/2013 | Baert et al. | |
| 2004/0054050 A1 | 3/2004 | Pascal et al. | |
| 2008/0207819 A1* | 8/2008 | Pascal et al. | C08F 14/08 524/502 |
| 2009/0124748 A1* | 5/2009 | Baert et al. | C08L 27/06 524/502 |
| 2016/0017136 A1 | 1/2016 | Hochstetter et al. | |
| 2016/0215133 A1 | 7/2016 | Bonnet et al. | |
| 2019/0031869 A1* | 1/2019 | Grestenberger et al. | C08F 2/001 |
| 2019/0055328 A1* | 2/2019 | Meier et al. | C08F 10/02 |

FOREIGN PATENT DOCUMENTS

FR 2935706 3/2010

* cited by examiner

Primary Examiner — Nathan M Nutter
(74) Attorney, Agent, or Firm — Joanne Rossi; Thomas Roland

(57) ABSTRACT

The present invention concerns a fluorinated polymer composition, methods for producing same, and products that can be produced from said composition. More particularly, the invention concerns a thermoplastic polymer composition comprising the following components A, B and C: A—a polyvinylidene fluoride (PVDF) homopolymer comprising a fraction of ultra high molecular weight chains (UHMCF); B—a vinylidene fluoride (VDF) elastomeric copolymer and at least one other fluorinated comonomer copolymerisable with VDF, and C—a VDF homopolymer having a lower viscosity than component A.

24 Claims, No Drawings

FLUORINATED POLYMER COMPOSITION

This application claims benefit, under U.S.C. § 119 or § 365 of PCT Application Number PCT/FR2016/051943, filed Jul. 27, 2016, and French Patent Application Number FR1557155, filed Jul. 27, 2015, these documents being incorporated herein by reference.

FIELD OF THE INVENTION

The invention relates to a fluorinated polymeric composition, to processes for the manufacture of the latter and to products which may be manufactured from this composition, in particular the polymeric sheaths of the flexible pipes used for the transportation of fluids of oil (offshore and onshore) or gas operations.

TECHNICAL BACKGROUND

The transportation of chemicals in the liquid or gas state in pipes exhibits numerous advantages: it is more economical, once the infrastructure has been installed, it makes possible the transportation of large volumes, it ensures great security of supply, by virtue of a steady output, and, finally, it is a safer means than rail or road.

The use is known, for the transportation of liquid or gas products, of metal or plastic pipes or also of metal pipes coated with one or more polymeric layers. Depending on the fluid to be transported, these pipes have to meet multiple requirements, in particular as regards the properties of mechanical strength (in particular impact strength), of elasticity, of creep strength, of fatigue strength, of resistance to swelling, of chemical resistance (resistance to corrosion, to oxidation, to ozone, to chlorinated products and the like) and of thermal resistance.

For example, pipes comprising one or more metal components guaranteeing the mechanical stiffness but which are not leaktight to the fluids transported (for example, components made of steel or of cast iron), and also various layers based on polymeric compositions, for ensuring leaktightness to the fluids transported and also thermal insulation, are known. Typically, in the case of the polymeric layers, the thickness/diameter ratio is of the order of 1/10. These polymeric compositions can be based on polyethylene but this limits the operating temperature of the pipes to at most 60° C. They can also be based on fluorinated polymers, such as polyvinylidene fluoride (PVDF), suitable for higher operating temperatures, up to 130° C., and exhibiting good chemical resistance and good thermal resistance. However, PVDF is very stiff and, for this reason, PVDF homopolymers are often formulated or used as a blend with copolymers based on vinylidene fluoride (VDF) and optionally plasticizer, in order to reduce the stiffness thereof Flexible pipes are also used for the transportation of oil or natural gas extracted from offshore or onshore deposits. These pipes are formed of multilayer structures comprising in particular polymeric sheaths and metal reinforcing layers or reinforcing layers made of composite materials.

The flexible pipes comprise, from the inside toward the outside:
  at least one internal leaktightness pipe in contact with the transported fluid, consisting of a polymeric material,
  one or more reinforcing layers surrounding said internal leaktightness pipe, and
  an external protected sheath.

The document BE 832851 describes fluorinated elastomers comprising a molar proportion of 50 to 85% of VDF and of 15 to 25% of hexafluoropropylene (HFP), i.e. a proportion by weight of 47 to 71% of VDF and of 29 to 53% of HFP, which are used for the manufacture of molded PVDF bodies comprising from 1 to 30% by weight of fluorinated elastomer. However, such compositions are of limited extrudability and do not make possible the manufacture of pipes having a thickness/diameter ratio of close to 1/10.

The document EP 1 342 752 describes PVDF-based compositions comprising: (A) a PVDF homopolymer or a VDF-based copolymer; (B) a fluorinated elastomer; (C) optionally a plasticizer. The fluorinated elastomer (B) is present at a content of 0.5 to 10 parts by weight per 100 parts of homopolymer or copolymer (A) and of 0 to 10 parts by weight of a plasticizer (C) with the additional condition that the sum of (B) plus (C) is from 0.5 to 10.5 parts by weight. These compositions correspond to the following proportions by weight: 89.5 to 90.5% of a PVDF homopolymer or a VDF-based copolymer (A); 0.5 to 9% of a fluorinated elastomer (B); 0 to 9% of a plasticizer (C). The contents of fluorinated elastomer, of less than 10%, do not make it possible to confer, on the finished product, characteristics of sufficient fatigue strength for the applications described above.

The document EP 608 639 describes polymeric compositions comprising, by weight, from 60 to 80% of PVDF, from 20 to 40% of a thermoplastic copolymer of VDF and of another fluorinated comonomer (present at a content of 5 to 25% in the copolymer) and from 5 to 20% of a plasticizer (with respect to the sum of the PVDF and copolymer). VDF/HFP copolymers appear among the thermoplastic copolymers envisaged. The HFP contents shown in the copolymers which are disclosed in the examples are of the order of 10%. However, these compositions undergo an extraction of the plasticizer on contact with some chemical substances. Consequently, the sheaths produced with these compositions do not retain a stable geometry, their volume and thus their thickness having a tendency to decrease with time.

This phenomenon can have a detrimental effect on the leaktightness of the end fittings located at the two ends of the pipe. This is because the leaktightness between, on the one hand, the end of the pressure sheath and, on the other hand, the body of the end fitting is produced by a tightening process, that is to say a process of tightening the sheath between two concentric parts supported respectively by the internal and external faces of said sheath.

An excessive decrease in the thickness of the sheath can thus have the effect of degrading the tightening pressure and the leaktightness of the end fitting.

The document WO 2006/045753 describes polymeric compositions comprising a PVDF homopolymer, a thermoplastic fluorinated copolymer and a third component which can be a plasticizer at a content of 5% by weight at most, a perfluorinated polymer or a VDF polymer of low molecular weight. The thermoplastic fluorinated copolymer can, for example, be a copolymer of VDF and of another fluorinated comonomer, which can be present in a content of 5 to 25%. Characteristically, the blend of PVDF homopolymer and of fluorinated copolymer has a mean intrinsic viscosity of less than 2 dl/g. Furthermore, the polymeric composition exhibits an apparent melt viscosity of less than or equal to 60 000 Pa·s, at a rate gradient of 1 $s^{-1}$. However, the fluorinated polymeric compounds of the tubular structures produced with such compositions are not entirely satisfactory. In particular, when the structures are subjected to repeated movements due to marine currents, the fatigue strength of these fluorinated polymeric compounds is judged insufficient.

The document FR 2987624 describes compositions comprising a PVDF homopolymer, an elastomeric fluorinated copolymer and a plasticizer. The copolymer exhibits elastomeric properties which it confers on the fluorinated polymeric compound and which makes it possible not only to increase the fatigue strength of said compound but also to improve the resistance to cold. This is an essential difference from the subject matter of the document WO 2006/045753, where compositions capable of forming nonelastomeric fluorinated polymeric compounds are specifically desired. However, the extraction of the plasticizer which takes place during the lifetime of the tubular structure, in addition to modifying the geometry of the sheaths (variation in volume and thickness), as already mentioned above, gradually results in a loss in the properties initially introduced by the plasticization (flexibility, toughness), consequently limiting the lifetime of the articles based on these compositions.

The object of the present invention is thus to develop a novel polymeric composition based on a specific PVDF homopolymer, on an elastomeric fluorinated copolymer and on a third fluorinated component of low viscosity, said composition exhibiting mechanical and chemical properties which are improved with respect to the known compositions and which do not change during the life of the pipe in service, in order to manufacture pipes which remain mechanically reliable over the long term, in particular for the pressure single-sheath application used in the offshore field.

SUMMARY OF THE INVENTION

The invention relates firstly to a thermoplastic polymeric composition comprising the following components A, B and C:

A—a polyvinylidene fluoride (PVDF) homopolymer comprising a fraction of chains of very high molar mass (FCVHM);

B—an elastomeric copolymer of vinylidene fluoride (VDF) and of at least one other fluorinated comonomer which can copolymerize with VDF, and C—a VDF homopolymer defined by the ratio of the viscosity of the component A to its own viscosity, as indicated below.

Advantageously, the polymeric composition according to the invention is devoid of plasticizer.

Characteristically, the component A is a PVDF homopolymer comprising a fraction of chains of very high molar mass (FCVHM), which are defined as being chains with a molar mass of greater than 3 000 000 g/mol, encompassing in particular chains not transferred or transferred late (FCNT) defined below. The other chains of the component A are manufactured by initiation and transfer or transfer which is earlier and have molar masses of less than 3 000 000 g/mol.

The proportion by weight of the chains of very high molar mass in the component A is calculated by the following formula:

100—(proportion by weight of chains with a molecular weight of less than 3 000 000 g/mol, expressed as Polymethyl Methacrylate equivalent).

The proportion by weight of chains with a molecular weight of less than 3 000 000 g/mol, expressed as Polymethyl Methacrylate equivalent, in the component A is determined by size exclusion chromatography under the conditions described below. Dimethyl sulfoxide (DMSO), to which sodium nitrate ($NaNO_3$) has been added at a concentration of 0.1 mol/l, is both the eluent and the solvent of the samples. The concentration of the samples of component A prepared is 2 g/l and the dissolution is carried out for 4 hours at a temperature of 95° C. The solution obtained is filtered using a syringe filter with a porosity of 0.45 µm and a volume of 200 µl is injected into the size exclusion chromatography line. The latter is typically provided with 2 columns in series with a length of 300 mm and a diameter of 8 mm, with a particle size of 7 µm, with a porosity of 100 angstroms and 1000 angstroms, temperature-regulated at 50° C. Polymer Standards Service columns referenced PSS PFG 1000 Angstrom and PSS PFG 100 Angstrom were used. The detection at the column outlet is carried out with a differential refractometer. It is also temperature-regulated at 50° C. The standards used for the calibration of the columns are narrow polymethyl methacrylates (PMMAs) covering the separation range of the columns.

The proportion of the chains of very high molecular weight (in particular of the chains not transferred or transferred late) thus calculated represents up to 50% by weight of the component A, limit included.

The component A exhibits a melt flow index of less than or equal to 15 g/10 min, advantageously of less than or equal to 10 g/10 min, preferably of less than or equal to 5 g/10 min, according to the standard ISO 1133.

The component B is present in the composition at a content by weight of greater than 10%. According to one embodiment, the fluorinated comonomer which can copolymerize with VDF is chosen from vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro(methyl vinyl) ether (PMVE), perfluoro(ethyl vinyl) ether (PEVE) or perfluoro(propyl vinyl) ether (PPVE), perfluoro(1,3-dioxole), perfluoro(2,2-dimethyl-1,3-dioxole) (PDD), the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$, the product of formula $CF_2=CFOCF_2CF_2SO_2F$, the product of formula $F(CF_2)_nCH_2OCF=CF_2$ in which n is 1, 2, 3, 4 or 5, the product of formula $R1CH_2OCF=CF_2$ in which R1 is hydrogen or $F(CF_2)_z$ and z has the value 1, 2, 3 or 4, the product of formula $R3OCF=CH_2$ in which R3 is $F(CF_2)_z$ and z has the value 1, 2, 3 or 4, or also perfluorobutylethylene (PFBE), fluorinated ethylene propylene (FEP), 3,3,3-trifluoropropene, 2-trifluoromethyl-3,3,3-trifluoro-1-propene, 2,3,3,3-tetrafluoropropene or HFO-1234yf, E-1,3,3,3-tetrafluoropropene or HFO-1234zeE, Z-1,3,3,3-tetrafluoropropene or HFO-1234zeZ, 1,1,2,3-tetrafluoropropene or HFO-1234yc, 1,2,3,3-tetrafluoropropene or HFO-1234ye, 1,1,3,3-tetrafluoropropene or HFO-1234zc, and chlorotetrafluoropropene or HCFO-1224.

According to a preferred embodiment, the comonomer is hexafluoropropylene (HFP).

According to one embodiment, the elastomeric copolymer is present in the composition in a proportion by weight of more than 10 to 40%, advantageously of 15 to 40%, preferably of 17 to 35%, limits included.

The proportion by weight of comonomer in the copolymer is greater than 25%. Advantageously, it is: greater than or equal to 26%, and/or less than or equal to 40%, preferably less than or equal to 37%.

The component C is a VDF homopolymer having a lower viscosity than the component A; it is present in the composition in a proportion by weight ranging from 1 to 20%, in particular from 2 to 18% and preferably from 5 to 15%.

The ratio of the apparent melt viscosities of the components A and C is greater than or equal to 5, in particular greater than or equal to 10 and preferably greater than or equal 50. This ratio is less than 500, preferably less than 400. The apparent melt viscosities of the components A and C are expressed in Pa·s and are measured on a capillary rheometer at a temperature of 230° C. and a shear rate of 100 s$^{-1}$.

According to one embodiment, the thermoplastic polymer composition consists of:
A—a polyvinylidene fluoride homopolymer comprising a fraction of chains of very high molar mass (FCVHM);
B—a VDF/HFP copolymer, and
C—a VDF homopolymer,
the components A, B and C being as defined herein.

Another subject matter of the invention is a process for the manufacture of the above composition, comprising the blending of the homopolymer, of the copolymer, of the fluorinated modifier and of the optional additives. This manufacturing process comprises any method which makes it possible to obtain a homogeneous blend of the different constituents. Mention may in particular be made, among these methods, of melt or dry blending.

More particularly, the composition according to the invention is prepared by melt blending all the constituents on a compounding tool, such as a twin-screw extruder, a co-kneader, an internal mixer or an open mill.

According to one embodiment, the PVDF homopolymer (component A) and the elastomeric copolymer (component B) are in the dry form during the blending, preferably in the form of powders, and the blending with the component C is preferably carried out in the molten state on a compounding tool, such as a twin-screw extruder, a co-kneader, an internal mixer or an open mill.

According to one embodiment, the above process comprises the blending of the PVDF homopolymer (component A) and the elastomeric copolymer (component B) in the latex form, the drying of the blend of homopolymer and copolymer and the combining of the dried blend with the component C, which is carried out in the molten state on a compounding tool, such as a twin-screw extruder, a co-kneader, an internal mixer or an open mill.

The composition according to the invention obtained by the manufacturing process described above can subsequently be transformed for use in the form of pipes or of cables, in particular using devices such as an extruder equipped with a suitable die.

Another subject matter of the invention is, generally, a pipe comprising at least one layer consisting of the composition according to the invention.

According to one embodiment, said pipe is intended to be employed as polymeric sheath for the flexible pipes used for the transportation of fluids of oil and gas operations. In this form, the sheath can be used, in combination with at least one reinforcing layer and possibly an external protective sheath, as flexible pipe for the transportation of fluids of oil or gas operations.

According to one embodiment, said pipe is a pipe for the onshore transportation of products in the gas state.

According to one embodiment, the abovementioned pipe is for the transportation of gas products, in particular for the transportation of hydrogen, oxygen, steam, carbon monoxide, ammonia, hydrogen fluoride, hydrochloric acid, hydrogen sulfide, any gas resulting from the cracking of hydrocarbons, or mixtures of these.

According to one embodiment, said pipe is intended for the onshore transportation of products in the liquid state, for example the transportation of water, solvents, petroleum products or mixtures of these.

According to one embodiment, the abovementioned pipe is an underground pipe for service stations or a fuel feed pipe for vehicles.

Another subject matter of the invention is an electric cable manufactured from the abovementioned composition.

Another subject matter of the invention is the use of the composition described above in the manufacture of pipes or electric cables.

The present invention makes it possible to overcome the disadvantages of the state of the art. It more particularly provides a novel polymeric composition exhibiting improved mechanical and chemical properties which do not change during the life of the material while being easily transformable by melt extrusion or co-extrusion.

This composition thus makes it possible to manufacture pipes which remain mechanically reliable over the long term. The composition according to the invention is particularly appropriate for the manufacture of polymeric sheaths for flexible pipes intended for the transportation of fluids of oil operations and pipes for the transportation of synthetic liquid or gas products (for example for the transportation of hydrogen). As already mentioned, the composition according to the invention is particularly capable of being processed by extrusion or co-extrusion, which makes possible its transformation into the form of pipes.

This is accomplished by combining, with a PVDF homopolymer comprising a fraction of nontransferred chains, an elastomeric VDF-based copolymer, the copolymer being present in the final composition in a proportion of more than 10%, and by adding a PVDF homopolymer of low viscosity to the composition at a content by weight of 20% at most. The use of a PVDF homopolymer, the molecular weight of which is very high, confers, on the composition, improved properties of cold impact strength and fatigue strength. Combining with a copolymer of elastomeric nature additionally makes possible the formation of a two-phase system in which the elastomer nodules act as reinforcer, which results in cold impact and fatigue properties which are further improved. Finally, the addition of a PVDF homopolymer of low viscosity makes it possible to lower the viscosity of the composition in order to render it easily transformable by melt extrusion or co-extrusion. In addition, the use, in order to do this, of a PVDF homopolymer with a lower viscosity than that of the component A (component C) makes it possible to obtain a 100% fluorinated composition, in which all the components are compatible and which do not encounter problems of selective degradation and/or of extraction of the plasticizer in contact with certain chemical substances, which are known during the use of a plasticizer such as dibutyl sebacate (DBS). The use of a PVDF homopolymer of low viscosity instead of an extractable plasticizer makes it possible to retain the mechanical properties of the composition over time, in particular the impact strength and fatigue strength, and also to avoid the variation in volume of the objects obtained from the composition. In particular when the composition is used for the manufacture of polymeric sheaths for flexible pipes intended for the transportation of fluids of oil operations and pipes for the transportation of synthetic liquid or gas products (for example for the transportation of hydrogen), the pipe under consideration is mechanically reliable over the long term and its volume is retained over time, which makes possible a simplified design of the end fittings.

DESCRIPTION OF EMBODIMENTS OF THE INVENTION

The invention is now described in greater detail and in a nonlimiting manner in the description which follows.

According to a first subject matter, the invention relates to a thermoplastic polymer composition comprising the following 3 components:

A—a PVDF homopolymer comprising a fraction of chains of very high molar mass (FCVHM);

B—an elastomeric copolymer of VDF and of at least one other fluorinated comonomer which can copolymerize with VDF, and C—a PVDF homopolymer of low viscosity.

The component A is a PVDF homopolymer comprising up to 50% by weight of chains with a molar mass of greater than 3 000 000 g/mol, representing the fraction of chains of very high molar mass. Said fraction is advantageously between 20 and 50%, preferably from 25 to 45%, by weight of the component A.

These polymers are known; their preparation has been described by the Applicant Company in the document EP 1 279 685.

These polymers are prepared by an in particular emulsion synthesis process in which:

a dispersion of VDF (vinylidene fluoride) in water is prepared, optionally using a surfactant, said dispersion being initially brought into contact with a nonorganic water-soluble initiator capable of bringing about the polymerization of the monomers;

then, a portion of the PVDF having been formed in the presence of the nonorganic water-soluble initiator, the following is added: either (i) a chain-transfer agent capable of propagating the polymerization; said polymerization is then initiated by a nonorganic water-soluble initiator or by an organic initiator, or (ii) an organic initiator capable of also carrying out the chain transfer and optionally a nonorganic water-soluble initiator.

The principle of this process is based on the formation, at the beginning of polymerization, of a fraction of macromolecular chains of very high molar mass, produced before the introduction of transfer agent (or before a secondary reaction of transfer or termination type contributing to greatly restricting the chain length) and without initiator capable of inducing a transfer reaction. The reaction thus begins without transfer agent (CTA), and the first charge of CTA is injected at a degree of conversion of the monomers for example of the order of 5% by weight. The necessary dose of CTA can then be introduced incrementally or continuously, the total amount and the rhythm of introduction making it possible to adjust the average molar mass of the polymer. In the case of a single injection of transfer agent, the product obtained will show a specific distribution of the molecular weights with a first population of very high weight and a second population of limited weight. The stage of polymerization after addition of the first dose of transfer agent can also be carried out under the effect of an organic initiator, the contribution of which to the transfer reactions will be greater or lesser.

In the specific case of an organic initiator having a sufficient transfer effect to adjust the molar mass, it is also possible to dispense with the transfer agent proper without changing the nature of the invention. In this case, the FCVHM is still obtained during the first stage of polymerization in the presence of the nonorganic initiator, and a second fraction of moderate molar mass is formed under the sole action of the organic initiator.

The degree of conversion of the VDF before the first injection of CTA determines the fraction of chains of very high mass (in particular chains not transferred or transferred late) formed without transfer agent, referred to as "fraction of chains not transferred". Then, the chains of very high mass having been formed, the number of injections or the flow rate for introduction of the CTA determines the distribution of the molar masses of the fraction of the PVDF which is not of very high mass. The total volume of CTA is not a critical parameter. It has to be adjusted so as to fix the average molar mass of the polymer, which is associated with the melt viscosity. The volume of water in which the dispersion of the monomers is produced, the amounts of surfactant, of initiator and of CTA can be easily determined by a person skilled in the art. The polymerization is carried out in a stirred reactor and then the PVDF (it is in the form of solid particles) and the water are separated by any means. These techniques are known per se and are described in the patents U.S. Pat. Nos. 4,025,709, 4,569,978, 4,360,652, EP 626 396 and EP 0 655 468. Advantageously, the aqueous emulsion is polymerized at a temperature of 50 to 130° C. Preferably, the polymerization is carried out at an absolute pressure of 40 to 120 bar.

As regards the surfactant, any product capable of dispersing the monomers in the water in order to facilitate their polymerization is thus denoted. The patents U.S. Pat. Nos. 4,025,709, 4,569,978, 4,360,652, EP 626 396, EP 0 655 468, EP 1 891 153 and EP 2 089 463 describe the processes for the synthesis of PVDF by aqueous emulsification of the VDF and its polymerization; numerous formulae for surfactants are found therein. The amount of surfactant introduced at the start of or during polymerization can be between 0.01 and 5 parts per 100 parts of water present in the initial charge of the reactor.

As regards the nonorganic water-soluble initiator capable of bringing about the polymerization of the VDF, mention may essentially be made of inorganic peroxides, for example in the form of salts, such as potassium persulfate or sodium persulfate. The amount of initiator can be between 0.002 and 0.2 part per 100 parts of monomers consumed in the reaction. Different coreactants well known to a person skilled in the art can also be added to these inorganic peroxides in order to increase their rate of decomposition or to lower their operating temperature.

As regards the organic initiator optionally employed to continue the reaction, mention may essentially be made of hydrocarbon peroxides, such as di(tert-butyl) peroxide, dicumyl peroxide or benzoyl peroxide, dialkyl percarbonates, such as diethyl or diisopropyl percarbonate, peracids or peresters, such as t-butyl perpivalate, t-amyl perpivalate or t-butyl peroxybenzoate.

As regards the transfer agent, any product which makes it possible to limit the molar mass of the polymer while propagating the polymerization reaction is thus denoted. Mention may be made, by way of example, of acetone, isopropanol, methyl acetate, ethyl acetate, diethyl ether, n-butyl acetate, diethyl malonate and diethyl carbonate and different chlorofluorocarbon compounds. The amount of transfer agent depends essentially on its nature and on the average molar mass desired for the fraction of polymer obtained in its presence, which conditions the mean viscosity of the final product. Preferably, the transfer agent employed represents from 0.01 to 5 parts per 100 parts of monomers consumed in the reaction.

As regards the proportion of the chains of very high molar mass (in particular chains not transferred or transferred late), it can represent up to 50% by weight of the component A and it is advantageously between 20 and 50%, preferably from 25 to 45%, limits included.

In one embodiment, the PVDF homopolymer used in the context of the invention as component A exhibits a melt flow index of less than or equal to 15 g/10 min, advantageously of less than or equal to 10 g/10 min and ideally of less than or equal to 5 g/10 min, according to the standard ISO 1133 (230° C., 12.5 kg), in order to guarantee good mechanical strength properties.

The component B is present in the composition at a content by weight of greater than 10%. According to one embodiment, the elastomeric copolymer is present in the composition in a proportion by weight of more than 10 to 40%, advantageously of 20 to 40%, preferably of 25 to 35%, limits included.

According to some embodiments, the content by weight of copolymer in the composition is greater than or equal to 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%.

According to some embodiments, the content by weight of copolymer in the composition is less than or equal to 39%, or 38%, or 37%, or 36%, or 35%, or 34%, or 33%, or 32%, or 31%, or 30%, or 29%, or 28%, or 27%, or 26%, or 25%, or 24%, or 23%, or 22%, or 21%, or 20%, or 19%, or 18%, or 17%, or 16%, or 15%, or 14%, or 13%, or 12%, or 11%.

The proportion by weight of comonomer in the copolymer is greater than 25%. Advantageously, it is: greater than or equal to 26%, and/or less than or equal to 40%, preferably less than or equal to 37%.

According to one embodiment, when the comonomer is HFP, the proportion by weight of HFP in the copolymer is greater than 25%. Advantageously, it is: greater than or equal to 26%, and/or less than or equal to 40%, preferably less than or equal to 37%.

The proportion by weight of HFP in the elastomeric copolymer is preferably estimated by nuclear magnetic resonance (NMR). Use may in particular be made of the $^{19}F$ NMR method described below. The copolymer samples are dissolved in an NMR tube with a diameter of 5 mm. The copolymer samples are dissolved in $d_8$-tetrahydrofuran ($d_8$-THF) at 60° C. An amount of copolymer (approximately 10 mg) is placed in a tube and solvent is added to fill 5.5 cm of tube (approximately 0.75 ml of solvent). A heating block is used to bring the samples to the desired temperature. The samples are heated for at least one hour until the solid has dissolved and the gel has disappeared. The tubes are inverted in order to confirm the absence of gel.

Typically, the spectra are acquired on a spectrometer of Bruker Advance type operated at 60° C. and are analyzed according to a method analogous to that described in "Composition and sequence distribution of vinylidene fluoride copolymer and terpolymer fluoroelastomers. Determination by $^{19}F$ NMR spectroscopy and correlation with some properties.", M. Pianca et al., *Polymer*, 1987, vol. 28, 224-230. However, the integration of the CF group instead of the $CF_3$ group is used.

Preferably, the elastomeric copolymer used for the preparation of the composition according to the invention is devoid of homopolymer.

The copolymer can be manufactured by the process described in the abovementioned publication by M. Pianca et al.

"Elastomeric" copolymer is intended to denote, as defined by the ASTM in the *Special Technical Publication*, No. 184, a material which is capable of being stretched, at ambient temperature, up to twice its own length and which, once released after maintaining under tension for 5 minutes, recovers its initial length to within about 10% in the same time.

The fluorinated elastomers which can be used in the context of the invention can be chosen from true elastomers or polymer resins acting as base constituent for the production of true elastomers.

The component C is a VDF homopolymer of low molecular weight; it is present in the composition in a proportion by weight ranging from 1 to 20%, in particular from 2 to 18% and preferably from 5 to 15%.

Advantageously, the ratio of the apparent melt viscosities of the components A and C is greater than or equal to 5, in particular greater than or equal to 10 and preferably greater than or equal to 50. This ratio is less than 500, preferably less than 400. The apparent melt viscosities of the components A and C are expressed in Pa·s and are measured on a capillary rheometer at a temperature of 230° C. and a shear rate of 100 $s^{-1}$.

In addition to the component A, copolymer B and component C, the composition according to the invention can comprise at least one additive and/or at least one filler and/or electrically conductive particles and/or inorganic or organic pigments or dyes.

Mention may be made, among the possible fillers, without implied limitation, of mica, alumina, talc, carbon black, graphenes, expanded graphites, carbon nanotubes, glass fibers and calcium carbonate.

Mention may be made, among the possible additives, without implied limitation, of UV stabilizers (preferably with the exception of the agents of Irganox® type), flame retardants, heat stabilizers and manufacturing adjuvants (preferably with the exception of polyolefins and in particular ethylene-based polymers).

When they are present, the above compounds, which are distinct from the PVDF having FCVHM, the copolymer and the PVDF homopolymer of low mass, are present at a content of 20% at most, preferably of 15% at most, or of 10% at most, or of 7% at most, or of 5% at most, or of 3% at most, or of 2% at most, or of 1% at most (in proportion by weight with respect to the total composition).

Another subject matter of the invention is a process for the manufacture of the above composition, comprising the blending of the PVDF homopolymer (component A), of the elastomeric copolymer (B) and of the PVDF homopolymer of low molar mass (component C). This manufacturing process comprises any method which makes it possible to obtain a homogeneous blend of the different constituents. Among these methods, mention may in particular be made of melt blending or dry blending. More particularly, the composition according to the invention is prepared by melt blending all the constituents on a compounding tool, such as a twin-screw extruder, a co-kneader, an internal mixer or an open mill.

According to one embodiment, the PVDF homopolymer having FCVHM (component A) and the copolymer (component B) are in the dry form during the blending, preferably in the form of powders.

According to one embodiment, the above process comprises the preblending of the components A and B in the latex (or emulsion) form, and then the drying of the preblend to give a powder. An alternative form consists in preblending the component A in the latex form with the copolymer B in the powder form (or vice versa), and in then drying this type of preblend to give a powder.

The component C in the powder or latex form, and also the optional additives, can be incorporated in the compositions during the blending of the PVDF and the copolymer, or also blended with one or other of these constituents prior to their blending, or also during the preblending of the PVDF and the copolymer according to the preblending techniques set out above.

The composition according to the invention makes it possible to manufacture:

any type of pipe for the transportation of gas or liquid products, in particular intended to transport gas products for the synthesis of chemicals or intended to transport products for individual, industrial or public consumption, flexible pipes and umbilicals used onshore and offshore to contain and/or transport crude oil, natural gas, water and other gases used for drilling, as defined in the standards API 17J, API 17K, API 16C and API 15S.

The invention claimed is:

1. A thermoplastic polymeric composition comprising the following components A, B and C:

A—a polyvinylidene fluoride (PVDF) homopolymer comprising up to 50% by weight of a fraction of chains of very high molar mass (FCVHM) which are chains having a number average molar mass of greater than 3,000,000 g/mol, the component A exhibiting a melt flow index of less than or equal to 15 g/10 min, according to the standard ISO 1133 at 230°C. and under load of 12.5 kg;

B—an elastomeric copolymer of vinylidene fluoride (VDF) and of at least one other fluorinated comonomer which can copolymerize with VDF, and C—a VDF homopolymer, such that the ratio of the apparent melt viscosities of the components A to C, expressed in Pa·s is greater than or equal to 5 and less than 500, the apparent melt viscosities of the components A and C being measured on a capillary rheometer at a temperature of 230° C. and a shear rate of 100 s$^{-1}$, and wherein the fluorinated comonomer which can copolymerize with VDF is selected from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro (methyl vinyl) ether (PMVE), perfluoro(ethyl vinyl) ether (PEVE) or perfluoro(propyl vinyl) ether (PPVE), perfluoro (1,3-dioxole), perfluoro(2,2-dimethyl-1,3-dioxole) (PDD), the product of formula CF2=CFOCF2CF(CF3)OCF2CF2X in which X is SO2F, CO2H, CH2OH, CH2OCN or CH2OPO3H, the product of formula CF2=CFOCF2CF2SO2F, the product of formula F(CF2) nCH2OCF=CF2 in which n is 1, 2, 3, 4 or 5, the product of formula R1CH2OCF=CF2 in which R1 is hydrogen or F(CF2)z has the value 1, 2, 3 or 4, the product of formula R3OCF=CH2 in which R3 is F(CF2)z and z has the value 1, 2, 3 or 4, or also perfluorobutylethylene (PFBE), fluorinated ethylene propylene (FEP), 3,3,3-trifluoropopene, 2-trifluoromethyl-3,3,3-triflouoro-1-propene, 2,3,3,3-tetrafluoropropene (HFO-1234yf), E-1,3,3,3-tetrafluoropropene (HFO-1234zeE), Z-1,3,3,3-tetrafluoropropene (HFO-1234zeZ), 1,1,2,3-tetrafluoropropene (HFO-1234yc) 1,2,2,3-tetrafluuoropropene (HFO-1234ye) 1,1,3,3-tetrafluoropropene (HFO-1234zc), and chlorotetrafluoropropene (HCFO-1224).

2. The composition as claimed in claim 1, in which said PVDF homopolymer having FCVHM comprises a fraction of chains of very high molar mass representing between 20 and 50% by weight of the component A.

3. The composition as claimed in claim 1, in which the proportion by weight of chains of very high molar mass in the component A is calculated by the following formula:

100−(proportion by weight of chains with a number average molecular weight of less than 3,000,000 g/mol, expressed as Polymethyl Methacrylate equivalent), said proportion by weight of chains with a number average molecular weight of less than 3,000,000 g/mol, expressed as Polymethyl Methacrylate equivalent, being determined by size exclusion chromatography.

4. The composition as claimed in claim 1, in which the component A exhibits a melt flow index of less than or equal to 10 g/10 min, according to the standard ISO 1133.

5. The composition as claimed in claim 1, in which the elastomeric copolymer is present in a proportion by weight of more than 10 to 40%.

6. The composition as claimed in claim 1, in which the proportion by weight of comonomer in the elastomeric copolymer is greater than 25%.

7. The composition as claimed in claim 1, in which said comonomer is hexafluoropropylene (HFP).

8. The composition as claimed in claim 1, in which the proportion by weight of component C is from 1 to 20%.

9. The composition as claimed in claim 1, in which the ratio of the apparent melt viscosities of the components A and C, expressed in Pa·s, is greater than or equal to 10, and it is less than 500, the apparent melt viscosities of the components A and C being measured on a capillary rheometer at a. temperature of 230° C. and a shear rate of 100 s$^{-1}$.

10. The composition as claimed in claim 1, said composition consisting of the components A, B and C.

11. The composition as claimed in claim 10, in which the component B is a VDF-HFP copolymer.

12. The composition as claimed in claim 1, said composition comprising at least one additive and/or at least one filler and/or electrically conductive particles and/or inorganic or organic pigments or dyes.

13. A process for the manufacture of a composition as claimed in claim 1, comprising blending of the components A, B, C and optional additives.

14. The process as claimed in claim 13, in which the components A and B are in the dry form during the blending with the component C, and the blending is carried out in the molten state.

15. The process as claimed in claim 13, comprising blending of the components A and B in the latex form, drying of said latex and combining in the molten state of the dried blend with the component C.

16. A pipe comprising at least one layer consisting of a composition as claimed in claim 1.

17. A polymeric sheath for flexible pipes used for the transportation of fluids of oil and gas operations, said sheath consisting of a composition as claimed in claim 1.

18. The pipe as claimed in claim 16, wherein said pipe is for the transportation of synthetic products in the gas state.

19. The pipe as claimed in claim 16, wherein said pipe is for the transport of products in the liquid state, selected from the group consisting of water, solvents, petroleum products and mixtures of these.

20. An electric cable manufactured from the composition as claimed in claim 1.

21. The pipe as claimed in claim 16, wherein said pipe is a flexible pipe for the transportation of fluids of oil and gas operations, wherein said pipe comprises a) a polymeric sheath consisting of said thermoplastic polymeric composition, said sheath being in contact with the fluid transported, b) at least one reinforcing layer and c) an external protective sheath.

22. The pipe as claimed in claim 16, wherein said transported gas is selected from the group consisting of hydrogen, oxygen, steam, carbon monoxide, ammonia, hydrogen fluoride, hydrochloric acid, hydrogen sulfide, any gas resulting from the cracking of hydrocarbons, and mixtures of these.

23. A thermoplastic polymeric composition comprising the following components A, B and C:
A—a polyvinylidene fluoride (PVDF) homopolymer comprising up to 50% by weight of a fraction of chains which are formed in the polymerization reaction prior to the addition of transfer agent and without initiator capable of inducing a transfer reaction, the component A exhibiting a melt flow index of less than or equal to 15 g/10 min, according to the standard ISO 1133 at 230° C., and under load of 12.5 kg;
B—an elastomeric copolymer of vinylidene fluoride (VDF) and of at least one other fluorinated comonomer which can copolymerize with VDF, and
C—a VDF homopolymer, such that
the ratio of the apparent melt viscosities of the components A to C, expressed in Pa·s is greater than or equal to 5 and less than 500, the apparent melt viscosities of the components A and C being measured on a capillary rheometer at a temperature of 230° C. and a shear rate of 100 s$^{-1}$, and wherein the fluorinated comonomer which can copolymerize with VDF is selected from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro (methyl vinyl) ether (PMVE), perfluoro(ethyl vinyl) ether (PEVE) or perfluoro(propyl vinyl) ether (PPVE), perfluoro (1,3-dioxole), perfluoro(2,2-dimethyl-1,3-dioxole) (PDD), the product of formula CF2=CFOCF2CF(CF3)OCF2CF2X in which X is SO2F, CO2H, CH2OH, CH2OCN or CH2OPO3H, the product of formula CF2=CFOCF2CF2SO2F, the product of formula F(CF2)nCH2OCF=CF2 in which n is 1, 2, 3, 4 or 5, the product of formula R1CH2OCF=CF2 in which R1 is hydrogen or F(CF2)z and z has the value 1, 2, 3 or 4, the product of formula R3OCF=CH2 in which R3 is F(CF2)z and z has the value 1, 2, 3 or 4, or also perfluorobutylethylene (PFBE), fluorinated ethylene propylene (FEP), 3,3,3-trifluoropropene, 2-trifluoromethyl-3,3,3-trifluoro-1-propene, 2,3,3,3-tetrafluoropropene (HFO-1234yf), E-1,3,3,3-tetrafluoropropene (HFO-1234zeE), Z-1,3,3,3-tetrafluoropropene (HFO-1234zeZ), 1,1,2,3-tetrafluoropropene (HFO-1234yc), 1,2,3,3-tetrafluoropropene (HFO-1234ye), 1,1,3,3-tetrafluoropropene (HFO-1234zc), and chlorotetrafluoropropene (HCFO-1224).

24. A thermoplastic polymeric composition comprising the following components A, B and C:
A—a polyvinylidene fluoride (PVDF) homopolymer, the component A exhibiting a melt flow index of less than or equal to 15 g/10 min, according to the standard ISO 1133 at 230° C., and under load of 12.5 kg;
B—an elastomeric copolymer of vinylidene fluoride (VDF) and of at least one other fluorinated comonomer which can copolymerize with VDF, and
C—VDF homopolymer, such that
the ratio of the apparent melt viscosities of the components A to C, expressed in Pa·s is greater than or equal to 5 and less than 500, the apparent melt viscosities of the components A and C being measured on a capillary rheometer at a temperature of 230° C. and a shear rate of 100 s$^{-1}$, and wherein the fluorinated comonomer which can copolymerize with VDF is selected from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro (methyl vinyl) ether (PMVE), perfluoro(ethyl vinyl) ether (PEVE) or perfluoro(propyl vinyl) ether (PPVE), perfluoro (1,3-dioxole), perfluoro(2,2-dimethyl-1,3-dioxole) (PDD), the product of formula CF2=CFOCF2CF(CF3)OCF2CF2X in which X is SO2F, CO2H, CH2OH, CH2OCN or CH2OPO3H, the product of formula CF2=CFOCF2CF2SO2F, the product of formula F(CF2)nCH2OCF=CF2 in which n is 1, 2, 3, 4 or 5, the product of formula R1CH2OCF=CF2 in which R1 is hydrogen or F(CF2)z and z has the value 1, 2, 3 or 4, the product of formula R3OCF=CH2 in which R3 is F(CF2)z and z has the value 1, 2, 3 or 4, or also perfluorobutylethylene (PFBE), fluorinated ethylene propylene (FEP), 3,3,3-trifluoropropene, 2-trifluoromethyl-3,3,3-trifluoro-1-propene, 2,3,3,3-tetrafluoropropene (HFO-1234yf), E-1,3,3,3-tetrafluoropropene (HFO-1234zeE), Z-1,3 ,3,3-tetraffuoropropene (HFO-1234zeZ), 1,1,2,3-tetrafluoropropene (HFO-1234yc), 1,2,3,3-tetrafluoropropene (HFO-1234ye), 1,1,3,3-tetrafluoropropene (HFO-1234zc), and chlorotetrafluoropropene (HCFO-1224).

* * * * *